United States Patent [19]
Rossio

[11] 3,789,981
[45] Feb. 5, 1974

[54] PARTS SEPARATOR
[75] Inventor: John H. Rossio, Portage, Mich.
[73] Assignee: La Ros Equipment Company, Inc., Portage, Mich.
[22] Filed: Aug. 10, 1972
[21] Appl. No.: 279,500

[52] U.S. Cl. ................................................ 209/78
[51] Int. Cl. ...................................................... B07c
[58] Field of Search .......................... 209/76, 77, 78

[56] References Cited
UNITED STATES PATENTS
| | | | |
|---|---|---|---|
| 2,964,180 | 12/1960 | Holzenthal | 209/78 |
| 3,621,997 | 11/1971 | Hobbs | 209/76 |
| 2,226,009 | 12/1940 | Miller | 209/76 X |
| 3,651,938 | 3/1972 | Suellentrop, Jr. | 209/78 |

FOREIGN PATENTS OR APPLICATIONS
332,927   7/1930   Great Britain ........................ 209/78

Primary Examiner—Allen N. Knowles
Attorney, Agent, or Firm—Woodhams, Blanchard & Flynn

[57] ABSTRACT

Separating device primarily for sorting separated but intermixed runners (and/or sprues) and molded parts discharged from a plastics molding machine. A belt carrying a series of projecting pins is arranged suitably around rollers to have at least one reach thereof oriented at a steep upward angle. The belt is driven in a direction such that it is moving upwardly as it passes through such reach. The pins are spaced apart transversley of said belt a distance so related to the size of the runners that such spacing is less than any dimension of the runners in at least one plane thereof and the parts are of less dimension in any plane than the transverse spacing of said pins.

11 Claims, 6 Drawing Figures

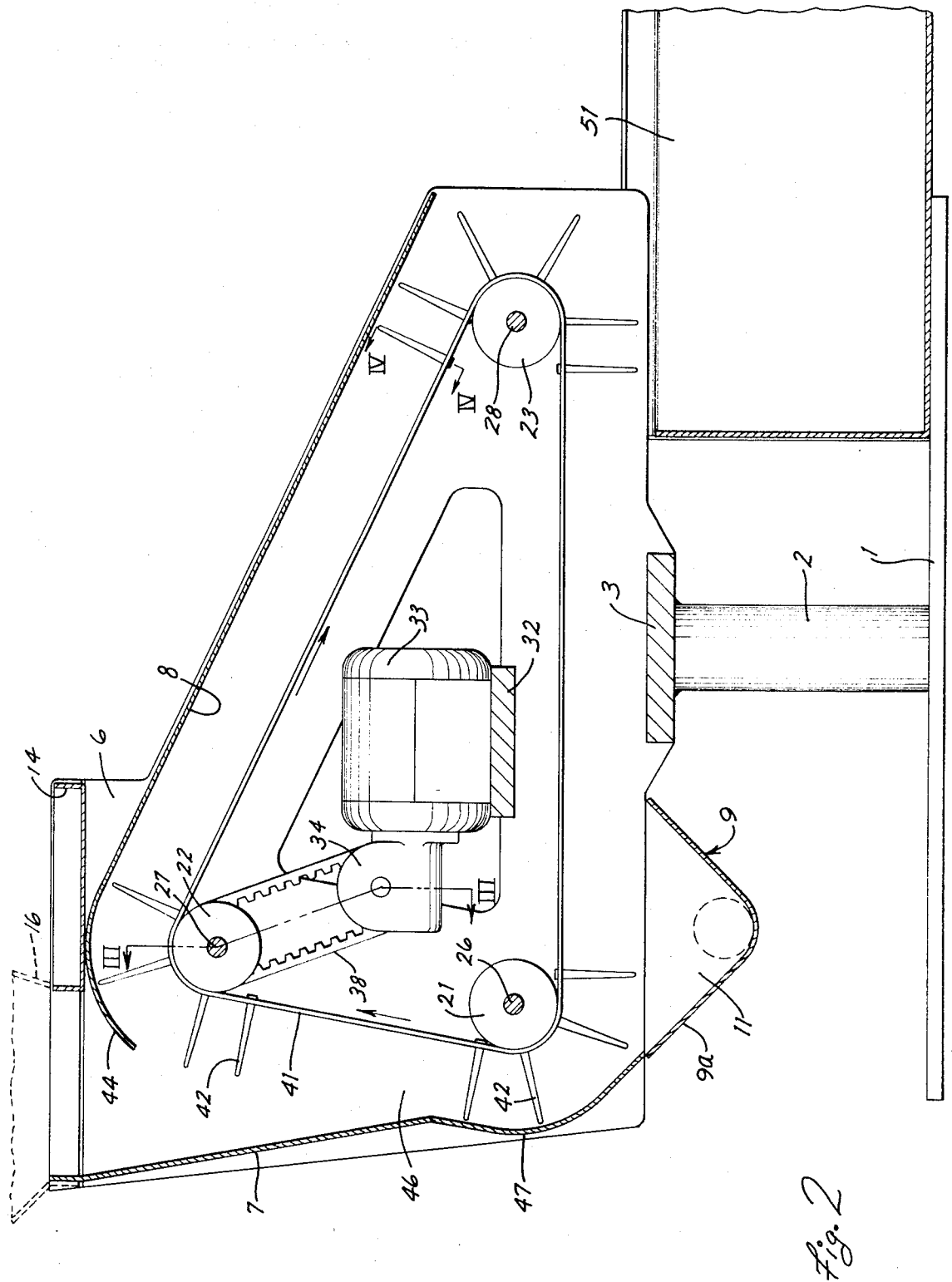

PATENTED FEB 5 1974 3,789,981

PARTS SEPARATOR

FIELD OF THE INVENTION

This invention relates to a separating device and particularly to a continuously operating separating device adapted for receiving broken-apart but intermixed runners (and/or sprues) and molded parts from a plastics molding machine and separating them in such a manner as to deliver the molded parts to one container and the runners (and/or sprues) to a separate container.

BACKGROUND OF THE INVENTION

In the molding of plastics parts, it has long been possible to obtain a high volume of molded parts on a short-cycle repetitive basis and with the use of only a single operator or, in some cases, by fully automated equipment. Further, it has long been normal practice to effect a separation of the molded part from the runners (and/or sprues, hereinafter for convenience referred to merely as "runners") automatically within the mold simultaneously with, or immediately prior to, the opening of same. This produces a mixture of molded parts and runners which, however, are delivered by the molding machine into a single container and thus require separation.

While this problem has existed for a long time, only a relatively few types of equipment have been thus far developed to effect such separation in an automatic manner. One type uses a pair of end-to-end arranged belts which provides a slot through which a relatively small molded part can drop while larger runners are carried beyond said slot. However, this type of sorting device is limited quite closely to the existence of a substantial difference in dimension between the molded part and the runner and, hence, is of relatively limited use. It also requires considerable floor space.

Other sorting devices have been developed for similarly narrow fields of use and, hence, while in most cases such devices are sufficiently satisfactory for as long as they are confined to their respective and specific fields of use, they are ineffective for multiple uses and hence have met with only limited acceptance in the plastics molding industry. Thus, in spite of the recognized expense involved, the majority of plastics molding establishments, particularly job shops handling a variety of of molding assignments, still rely upon manual sorting to separate molded parts from the runners. This is not only expensive but it constitutes an extremely boring job and consequent employee dissatisfactions and sometimes inattention.

Accordingly, the objects of the invention include the following:

1. To provide a continuously operating machine for automatically separating molded parts from runners of a plastics molding machine whereby said molded parts will be continuously supplied to one container and said runners will be continuously applied to a different container.

2. To provide such a machine having within a single embodiment thereof a wide range of potential applicability and which further may be readily modified where needed to accommodate itself to a still wider range of applicability.

3. To provide a machine, as aforesaid, which is of relatively simple nature and can accordingly be manufactured and installed at a relatively low level of expense.

4. To provide a machine, as aforesaid, which is of extreme mechanical simplicity and hence can operate over a long period of time, and do so continuously, with only minimal requirements for maintenance. 5. To provide a machine, as aforesaid, whose space requirements will not be unreasonable.

6. To provide a machine, as aforesaid, which is of such unitary nature as to be readily installable as desired alongside of a given plastics molding machine and which can be moved from one machine to another easily and quickly.

7. To provide a separating machine, as aforesaid, which will be of highly versatile nature and can be readily modified by simple interchange of parts to a variety of different operating conditions.

Other objects and purposes of the invention will be apparent to persons acquainted with apparatus of this general type upon reading the following specification and inspecting the accompanying drawings.

BRIEF DESCRIPTION OF THE DRAWINGS

FIG. 2 is a longitudinal central section taken through the machine shown in FIG. 1.

SUMMARY OF THE INVENTION

Figure 1:
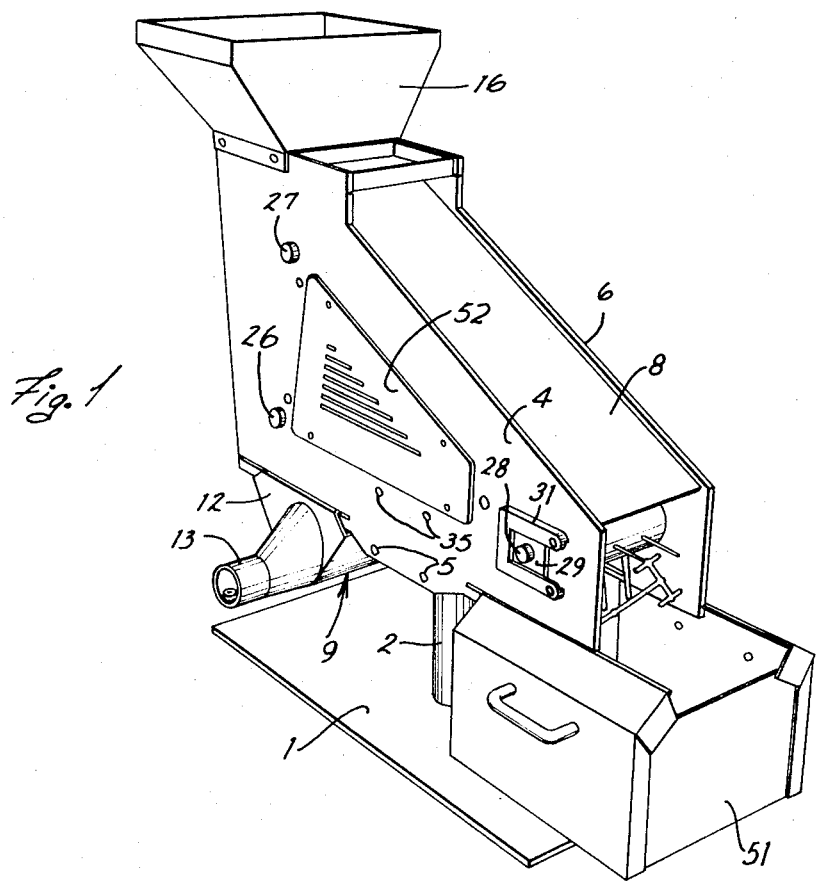
FIG. 1 is an oblique view of a machine embodying the invention.

The invention contemplates an endless belt defining in the preferred embodiment a generally polygonal, triangular in the illustrated embodiment, loop and having drive means positioned with in said loop. The belt has a series of fingers fixed thereto and projecting therefrom which fingers are chosen as to length, spacing and shape according to the runner system and parts being handled. In the embodiment shown, same are relatively long and slender and project substantially perpendicularly from the plane of the belt. The parts being relatively small pass between the fingers and out of the machine. The fingers above-mentioned engage the runners and convey them to suitable collecting means.

DETAILED DESCRIPTION

Referring now to the drawings, there is shown a base plate 1 having an upstanding post 2 secured thereto and projecting upwardly therefrom. At the upper end of said post 2 there is affixed, here by welding, a cross plate 3 to the ends of which are fastened, as by appropriate machine screws 5 a pair of upstanding side plates 4 and 6. An end closure 7 extends between the side plates 4 and 6 for generally closing the space between the leftward (as seen in FIG. 2) end of the space defined by the side plates 4 and 6 and a top plate 8 extends between said side plates and closes the upper side of said space. A trough 9 extends across the bottom of the zone between said side plates and is so positioned that one side thereof, here the side 9a is substantially a continuation of the lower end of the end closure 7.

Said trough 9 includes end plates 11 and 12 and any convenient type of discharge means, here indicated by the spout 13.

The side plates 4 and 6 further support a top closure member 14 which further spaces and rigidifies said side plates. Means for conveying intermixed parts and runners to the separating machine, said means being here indicated by a hopper 16, are located at the upper portion of said side plates and adjacent the top closure 14.

Between said side plates 4 and 6 there are provided belt supporting rollers 21, 22 and 23, here arranged in a generally triangular pattern. Said rollers 21 and 22 are supported respectively on shafts 26 and 27 which are journaled in any convenient manner in said side plates, preferably by bearings, not shown, mounted on the inside of said side plates. The roller 23 is mounted on a shaft 28 which may be similarly journaled on the side plates 4 and 6 but in this embodiment is shown as journaled onto a slide plate 29 which is in turn mounted for belt-adjustment purposes in a conventional U-shaped slide holder 31.

Figure 3:
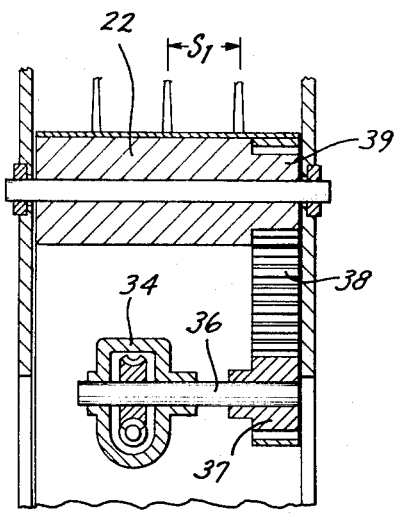
FIG. 3 is a section taken on the line III—III of FIG. 2.
Figure 4:
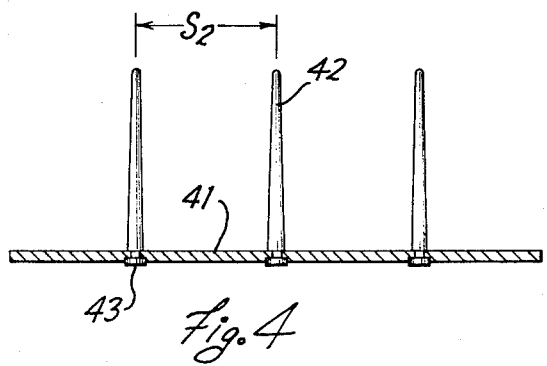
FIG. 4 is a detail of a portion of the belt showing the runner engaging pin.

A further cross member 32 is mounted, as by machine screws 35, between the side plates 4 an 6 and supports a drive motor 33. Said drive motor 33 acts through a conventional gear box 34 to drive an output shaft 36 and through it a pinion 37. Said pinion drives the toothed belt 38 which cooperates with a toothed portion 39 of the roller 22. As shown best in FIG. 3, the diameter of the said toothed portion 39 is such that when the belt 38 is in operative position with respect thereto, it will be flush with, and constitute a continuation of, the surface of said roller 22.

Figure 5:
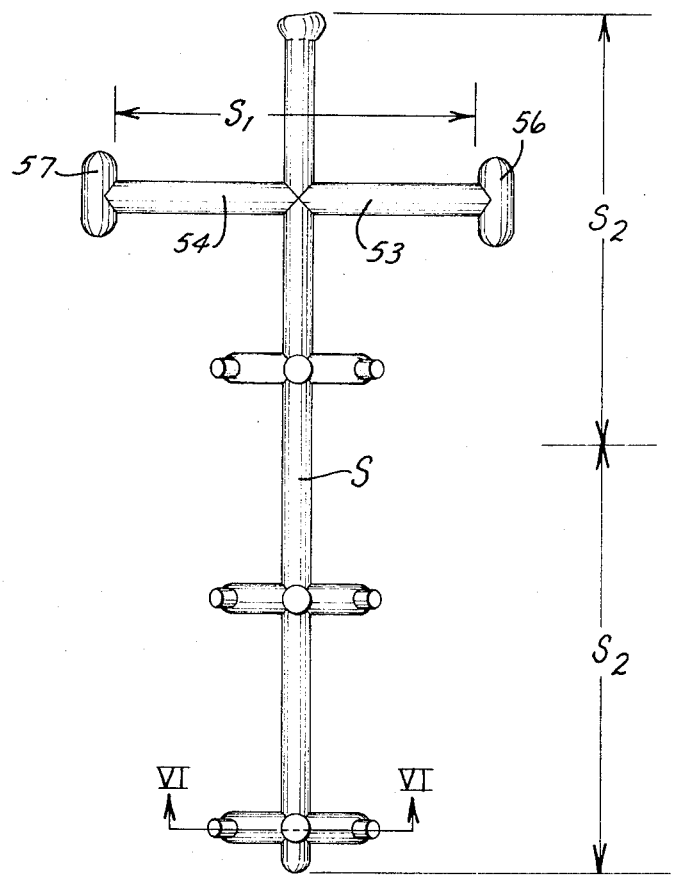
FIG. 5 is an elevation view of one typical runner system with which the machine of the invention is adapted to be used.
Figure 6:
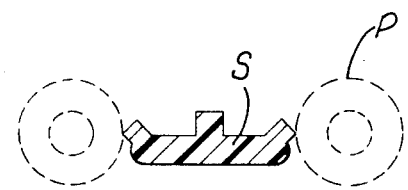
FIG. 6 is a section taken on the line VI—VI of FIG. 5 and showing in phantom a typical part molded with said runner system.

The belt 41 is arranged around said three rollers and carries a plurality of sprue engaging means, here indicated by the pins 42. In this embodiment said pins are tapered and are relatively long and slender, may be made of plastic, metal or other material as desired, and are fastened to the belt 41 in any convenient manner, such as by upsetting their respective belt ends, as indicated at 43. Said pins will be of whatever length, shape and spacing is required in view of the parts and runners being handled, to permit the parts to fall between same while picking up and conveying the runners. In the present embodiment wherein the machine is designed for handling small annular parts P indicated in FIG. 6 and same are molded on a somewhat tree-shaped runner S as indicated in FIGS. 5 and 6, the pins are spaced apart laterally a distance approximately that indicated at $S_1$ in FIG. 5. The longitudinal spacing of such pins may be somewhat more variable. However, if they are too far apart, the capacity of the machine is unnecessarily diminished and if they are too close together, there may be a tendency for the runners to gather too tightly and inhibit the flow of parts therethrough. Thus, an effective longitudinal spacing $S_2$ of the pins 42 is in the embodiment here shown taken as approximately one-half the major length of the runner S as appearing in FIG. 5.

On inspection of FIG. 2 it will be recognized that, for complete effectiveness in controlling the mixture of runners and parts fed into the hopper 16, there is provided a lip 44 at the upper end of the top closure 8 which prevents the runners and parts from falling into the upper and substantially horizontally moving portion of the belt, that is, said lip 44 insures that the runners and parts will fall against only the upwardly moving portion of the belt.

The end closure 7 is in this embodiment, and preferably, slanted somewhat inwardly to define with the adjacent portion of the belt 41 a converging channel as same approaches the throat 46. From said throat said end closure 7 then defines a curved portion 47 which is shaped to be close to but a clearance distance from the ends of the adjacent pins 42. Thus, intermixed runners and parts passing the throat 46 will be closely guided against the pins 42 which will ensure the catching of the runners on and by said pins while the parts pass on through into the trough 9.

In this manner, the parts, here indicated as the small annular members P, will fall on through the throat 46 and the portion immediately downward therefrom into the trough 9 and out the spout 13 into whatever collecting or conveying means is provided, while the runners being larger will be caught by the pins 42, carried up and over the roller 22 and dropped immediately after passing the roller 23. A suitable collector of any convenient type is provided to receive the runners dropped at this point. Said collector may be a container or a further conveyor as convenient but is here indicated as a container 51.

An access opening is conveniently provided through one or both of the side plates 4 and 6, same being then closed by closure plates as needed of which one is here indicated at 52.

The motor 33 may be of constant or variable speed nature as desired although a variable speed motor will be preferred in order to improve both the effectiveness and versatility of the machine herein concerned.

It will be recognized that the entire side plate 4 can be removed merely by removing the hopper 16, and the two pairs of screws 5 and 35. With said side plate removed, the belt 41 may be changed for maintenance or as desired in order to adapt the machine for other and different operations.

A further and important portion of the inventive concept here involved lies also in the design of the runner system as indicated in FIG. 5. In this case it will be recognized that the arms 53 and 54 of said runner together with the enlargements 56 and 57 associated respectively therewith are provided for the purpose of insuring that the pins will engage the runner and not let same slip therethrough. Thus, it will be seen that the runner must be made of sufficient extent, both longitudinally, transversely, and at any diagonal dimension therebetween, such that no dimension at least in a single plane will be smaller than the transverse spacing $S_1$ between the pins 42. However, from the manner in which the runners are fed from the hopper 16 onto the belt 41, particularly in the zone of the throat 46, it will be recognized that same will tend to lie flat against the belt or at least with the plane of the runner assuming a position substantially parallel to the plane of the belt. Thus, it is not necessary that the runner be dimensioned in all directions greater than the transverse spacing of the pin but only that it be so dimensioned in a single plane. This obviously makes possible the use of simpler runner system than would be necessary if all dimensions were required to be greater than the transverse spacing between said pins. Thus, it will be recognized that an important feature of the invention is the fact that the leftward (as seen in FIG. 2) reach of the belt has enough horizontal component to enable and cause said runners to tend to lie flat thereagainst and thereby be engaged by the pins while still being at a sufficiently steep angle that the parts will fall therethrough and not be captured within the mass of runners and carried along with them. Advantageous, though not exclusive, typical values for said steep angle will be from about 8° to about 11° with respect to the vertical.

While a specific embodiment of the invention has been shown herein for purposes of illustration, it will be recognized that variations may be employed, particularly to adapt the machine to other specific runner system and part designs, without departing form the scope of the invention as same are defined in the hereinafter appended claims.

The embodiments of the invention in which an exclusive property or privilege is claimed are defined as follows:

1. In a sorting system for separating runners and molded parts, the combination comprising:
   a plurality of runners having in at least one plane no dimension less than a predetermined dimension;
   a plurality of parts formed in association with said runners having maximum dimensions substantially less than said predetermined dimension;
   a frame;
   at least two belt supporting and guiding means supported on said frame and a belt in turn supported on and around said last-mentioned means, at least one reach of said belt defining a relatively wide angle with respect to the horizontal;
   a plurality of spaced runner engaging means projecting from said belt, the transverse spacing therebetween being not greater than said predetermined distance; and
   means defining a feed channel adjacent said one reach of said belt, one portion of said feed channel includes a wall making an angle with respect to the horizontal substantially equal to the angle so made by said one reach of said belt and another portion thereof defining a curve spaced only a small clearance distance away from the path followed by the tips of said runner engaging means as same enter said one reach of the belt;
   whereby when a mixture of runners and parts is supplied to said feed channel, said parts will fall therethrough to a point below said belt and said runners will be dimension and by said runner engaging means and removed from said feed channel.

2. In a machine for separating a mixture of molded parts and runners, wherein said runners have a maximum dimension in at least one plane no less than a predetermined dimensionand wherein said parts have a maximum dimension in any direction substantially smaller than said predetermined dimension, the combination comprising:
   a frame;
   at least three rollers supported on said frame, the first one of said rollers being supported substantially directly above but slightly horizontally offset from a second one of said rollers, and a third one of said rollers being substantially horizontally spaced from said first and second rollers whereby said three rollers are arranged in a triangular pattern;
   an endless belt supported on and around said rollers, said belt having one reach thereof extending between said first and second rollers with said one reach defining a relatively wide acute angle with respect to the horizontal; and
   means for separating a mixture of said parts and runners, said last-mentioned means including;
   1. runner-engaging means mounted on said belt and projecting outwardly from the outer surface thereof for engaging said runners, said runner-engaging means including a plurality of substantially straight elongated pins fixed to said belt and projecting outwardly from the outer surface thereof in substantially transverse relationship thereto, the transverse spacing between said pins being not greater than said predetermined dimension for enabling said pins to engage said runners while enabling said parts to freely pass between said pins, and
   2. means defining a feed channel adjacent said one reach of said belt for permitting said mixture of parts and runners to be supplied to the pins as mounted on said belt, said last-mentioned means including a wall portion disposed closely adjacent said one reach of said belt and spaced only a small clearance distance away from the path followed by the free ends of said pins associated with said one reach of said belt;
   whereby when said mixture of runners and parts is supplied to said feed channel, said parts fall between the spaced pins to a point below said belt and said runners become caught by said pins and moved upwardly around said first roller.

3. A machine according to claim 2, wherein said runner-engaging means includes a plurality of substantially parallel rows of said pins extending transversely across the width of said belt, said rows of pins being substantially uniformly spaced apart in the longitudinal direction of said belt, and each said row including therein an equal number of said pins with the individual pins within each row being uniformly spaced apart by a distance less than said predetermined dimension, and the individual pins in directly adjacent rows also being aligned with one another in the longitudinal direction of said belt.

4. A machine according to claim 2, wherein said one reach of said belt has the outer surface thereof projecting upwardly from said second roller toward said first roller at an angle of between about 8 degrees and about 11 degrees relative to the vertical.

5. A machine according to claim 2, wherein said frame includes a pair of substantially parallel side walls disposed substantially coextensive with said belt and spaced a predetermined distance apart, said belt being disposed directly between said spaced side walls and having a width substantially equal to but slightly less than said predetermined distance so that the opposite edges of said belt are disposed closely adjacent the inner surfaces of said side walls, said plurality of rollers being rotatably supported on and extending between said side walls, and drive means drivingly connected to one of said rollers for causing movement of said belt in a direction so that said one reach of said belt moves upwardly in a direction from said second roller toward said first roller.

6. A machine according to claim 5, wherein said drive means includes a driving member positioned between said side walls and within said belt, said driving member being disposed in driving engagement with said one roller.

7. A machine according to claim 6, wherein said one roller has a circumferential portion thereof formed with a toothed profile, said portion being partially surrounded by said belt, and said driving member also having a toothed profile formed thereon and disposed in driving engagement with the toothed portion of said one roller.

8. A machine according to claim 5, wherein said drive means includes motor means mounted on said frame and positioned between said side walls and disposed within said endless belt, and torque transmitting means drivingly connected between said motor means and said one roller, said torque transmitting means also being disposed between said side walls.

9. A machine according to claim 8, wherein said one roller includes a toothed circumferential portion which is partially surrounded by said belt, and wherein said torque transmitting means includes a toothed driving member positioned in driving engagement with the toothed circumferential portion of said one roller.

10. A machine according to claim 5, wherein said frame includes wall means defining a trough positioned directly below said one reach of said belt and extending between said parallel side walls for collecting and permitting discharge of said parts.

11. A machine according to claim 2, wherein said pins have a conical configuration, the configuration of said pins diverging in a direction from the free ends of the pins toward said belt.

* * * * *